Patented Nov. 14, 1950

2,530,344

UNITED STATES PATENT OFFICE 2,530,344

HYDROCARBON SYNTHESIS WITH SPHERICAL CATALYST PARTICLES

Rhea N. Watts, Baton Rouge, La., assignor to Standard Oil Development Company, a corporation of Delaware No Drawing. Original application April 2, 1947, Serial No. 738,915. Divided and this application September 6, 1947, Serial No. 772,595

3 Claims. (Cl. 260—449.6)

This application is a division of my co-pending application Serial No. 738,915 filed April 2, 1947, now abandoned.

The present invention is concerned with an improved process for the preparation of catalysts comprising iron. The invention is more specifically concerned with an improved process for synthesizing hydrocarbons containing more than 1 carbon atom in the molecule from feed gases comprising carbon monoxide and hydrogen. In accordance with my process improved hydrocarbon synthesis catalysts comprising iron spherical particles containing an iron core and an oxidized surface are prepared by spraying molten iron metal through a predetermined amount of air or through an atmosphere the oxygen content of which is controlled.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gels, silica and alumina. Promoters, such as oxides and salts of sodium, potassium, chromium, zinc, aluminum, magnesium and the rare earth metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 750° F. The pressures, likewise vary considerably and are a function of other operating conditions, such as catalyst employed, activity of the catalyst, character of the feed gases and the temperature utilized. Pressures in the range from about 1 to 100 and higher atmospheres have been suggested. Satisfactory pressures are in the range from about 50 pounds to 750 pounds per square inch. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron catalyst is utilized, the mol ratio of hydrogen to carbon monoxide in the range from about 1/1 to 4/1 is desirable.

The synthesis gases comprising hydrogen and carbon monoxide are produced by various procedures. Methane or natural gas may be oxidized with a reducible metal oxide, with pure oxygen or with gases comprising oxygen. Other feed stocks may comprise coal, shale and other hydrocarbons. The reaction may be conducted in a single or in a plurality of stages. For example, one procedure is to employ a two-stage reforming process using steam, methane and carbon dioxide for the production of carbon monoxide and hydrogen. When employing methane as feed gas and oxidizing the same with a reducible metal oxide, the reactions are generally conducted at temperatures in the range from about 1400° F. to about 2000° F. When the synthesis gases are produced by utilizing oxygen and natural gas, the temperatures in the reaction zone are usually in the range from about 2000° F. to about 3000° F.

It has, heretofore, been known in the art to contact gases and solids by passing the gases upwardly through an enlarged treating zone, containing a body of finely divided solids to be contacted, at a controlled velocity to maintain the solids in the treating zone in quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate. In these fluidized reactions the small subdivided solids or catalysts usually have a particle size in the range from about 1 to 200 microns and higher. These particles are suspended in a fluid ebullient state by means of the upflowing suspending gases, the velocity of which varies in the general range from about 0.1 to 5 feet per second.

My invention is concerned with the production of catalysts comprising iron spheres. The iron spheres of my process are characterized by having an iron core and an oxidized surface. My catalysts are particularly desirable for employment in hydrocarbon synthesis processes in view of the fact that one problem and difficulty in synthesis operations is that the catalyst disintegrates due to the formation of excessive carbon on the catalyst. Apparently carbon forms throughout the area of the catalyst particles causing it to fragmentate. I have discovered that provided the catalyst particles comprise an iron core and an oxidized surface the extent of the distintegration is restricted to the thickness of the oxidized surface. As hereinafter described I can readily control the extent and depth to which the surface skin is oxidized by controlling the extent to which the molten iron particles are passed through air. I can also control the extent and depth to which the iron is oxidized on the surface of the particles by employing an atmosphere in which the oxygen concentration is controlled. For example, I may employ an inert atmosphere such as nitrogen and control the oxygen concentration below about 20% as for example in the range from about 5 to 15% oxygen. On the other hand, it is within the concept of my invention to utilize an atmosphere in which the oxygen concentration is well above about 20% as for example, in the range from about 30% to 60% and higher.

The catalyst particles of my invention are produced by using relatively pure iron wire as for example iron wire which contains less than about 0.2% carbon and a metallizing gun. Although any suitable metallizing gun may be employed I use the metallizing gun sold under the trade name of "Metco" manufactured by Metallizing Engineering Co., Inc. at Long Island City, N. Y.

With the particular metallizing gun employed a reduced atmosphere existed in front of the gun for approximately 6 inches. Thus when the metal is impinged upon a surface within this distance substantially no oxidized metal is deposited upon this surface. When the surface is withdrawn beyond the six inch limit, the extent to which the metal is oxidized is a function of the distance the surface is withdrawn beyond the reducing atmosphere. As pointed out heretofore, the operation may be conducted in an atmosphere in which the extent of the oxygen concentration is predetermined. The distance then becomes a function of the oxygen concentration of the atmosphere in which the operation is conducted.

My invention may be readily understood by the following examples illustrating embodiments of the same.

*Example 1.*—Commercial spray iron wire, was sprayed with a metallizing gun, using oxygen and acetylene as fuel, into water from a distance of about three feet, at an angle of approximately 30°. The resulting spheres were collected, dried and screened through a 100 mesh screen. The yield was 95%. Analytical data on the spheres were:

| | Per cent |
|---|---|
| Oxygen content by analysis | 20.5 |
| Total iron as Fe | 79.9 |

The spheres consisted of approximately 74% $Fe_3O_4$ and 26% Fe.

Measurements of the spheres and the oxide surface coatings were:

| Diameter of Sphere | Thickness of Oxide Coating |
|---|---|
| Microns | Microns |
| 80 | 12 |
| 90 | 10 |
| 100 | 12 |
| 100 | 20 |
| 110 | 20 |
| 120 | 10 |
| 130 | 15 |

Spheres of the order of 40 microns in diameter had coatings about 15 microns in thickness. Spheres 20 microns in diameter were wholly oxidized.

A Roller analysis of the spheres was as follows:

| Microns | Per cent |
|---|---|
| 0–20 | 1 |
| 20–40 | 7 |
| 40–80 | 26 |
| 80+ | 66 |

Approximately 75% of the spheres were solid. The remainder were hollow or irregular.

The microspheres were promoted with $K_2CO_3$ by adding 17.3 g. of $K_2CO_3.1\frac{1}{2}H_2O$ dissolved in 20 ml. of hot water to 438.5 g. of spheres. The catalyst was dried and utilized in a hydrocarbon synthesis operation with the following results:

| | Iron Microspheres (Fixed Bed), (Oxidized 74%), 2.5% $K_2CO_3$ | | | |
|---|---|---|---|---|
| Operation | A | B | C | D |
| Temperature, °F | 600 | 600 | 600 | 600 |
| Feed, $H_2CO$ Ratio | 1.17 | 1.17 | 1.17 | 1.17 |
| Yields, Collected: | | | | |
| Oil,[1] cc./m.³ $H_2$+CO consumed | 94 | 112 | 121 | 131 |

[1] Cc. hydrocarbon of butane and higher boiling constituents.

*Example 2.*—Microspheres were prepared by spraying iron wire (as in Example 1) into water from a distance of 20 inches. The product was screened through an 80 mesh screen. The yield was 95%. Analysis of the microspheres showed 16.6% oxygen. This decrease in oxygen content is the result of spraying the iron through a shorter distance before allowing it to hit the water. On a weight basis the microspheres were about 60% $Fe_3O_4$. Examination of mounted microspheres metallographically revealed solid iron cores with iron oxide coatings varying from 3 to 10 microns. An analysis of the spheres was as follows

| Microns | Per cent |
|---|---|
| 0–20 | 3 |
| 20–40 | 10 |
| 40–80 | 28 |
| 80+ | 59 |

These spheres were employed in a hydrocarbon synthesis process with the following results:

| Operation | Iron Microspheres (Fixed Bed), surface oxidized (16.6% O₂) +2.0% K₂CO₃ | | |
|---|---|---|---|
| | A | B | C |
| Temperature, °F | 600 | 600 | 600 |
| Feed, H₂/CO Ratio | 0.92 | 0.92 | 0.92 |
| Yields, Collected: Oil, cc./m.³ H₂+CO consumed | | 114 | 114 |

*Example 3.*—The catalyst prepared as described in Example 2 was employed in fluid bed operations. The results were as follows:

| Operation | A | B | C |
|---|---|---|---|
| Temperature °F | 650 | 650 | 650 |
| Pressure pounds | 400 | 400 | 400 |
| Ratio H₂/CO | 2/1 | 2/1 | 2/1 |
| Yield:¹ | | | |
| Propane, Plus | 227 | 240 | 243 |
| Butane, Plus | 193 | 203 | 202 |

¹ Cc. of propane, butane and higher boiling constituents produced per m.³ of H₂ and CO consumed.

In these operations these catalysts resisted fragmentation.

In a continuation-in-part, Serial No. 51,987 filed September 30, 1948 of application Serial No. 738,915 filed April 2, 1947 of which the present application is a division, disclosure is made and claims are drawn to the preparation and promotion of the catalytic microsphere particles.

The process of my invention is not to be limited by any theory as to mode of operation but only in and by the following claims.

I claim:

1. Improved process for the synthesis of hydrocarbons which comprises introducing carbon monoxide and hydrogen into a synthesis zone maintained at temperature and pressure conditions adapted to effect said hydrocarbon synthesis, and contacting said hydrogen and carbon monoxide with a bed of fluidized iron spherical catalyst which catalyst has been introduced into said zone in the form of spheres characterized by having an unoxidized solid iron core and an oxidized iron surface.

2. In a hydrocarbon synthesis process wherein hydrogen and carbon monoxide are contacted in a hydrocarbon synthesis zone in the presence of a bed of fluidized iron type catalyst and wherein the catalyst disintegrates due to the formation of carbon on the catalyst, the improvement which comprises utilizing as the iron type catalyst, iron sphere particles having in the form in which they are introduced into said zone, an unoxidized solid iron core and an oxidized iron surface.

3. Process as defined by claim 2 wherein the particle size of the iron sphere catalyst is in the range from about 20 to 200 microns and wherein the thickness of the oxide iron surface is below about 20 microns.

RHEA N. WATTS.

REFERENCES CITED

The following references are of record in the file of this patent:

UNITED STATES PATENTS

| Number | Name | Date |
|---|---|---|
| 1,043,580 | Eldred | Nov. 5, 1912 |
| 2,360,787 | Murphree et al. | Oct. 17, 1944 |
| 2,462,861 | Gunness | Mar. 1, 1949 |

OTHER REFERENCES

Audibert: Industrial and Engineering Chemistry; vol. 21, No. 9 (Sept., 1929), pages 880 to 885.